US006790307B2

(12) United States Patent
Elliott

(10) Patent No.: US 6,790,307 B2
(45) Date of Patent: Sep. 14, 2004

(54) SHINGLES WITH MULTIPLE BLEND DROPS AND METHOD OF DEPOSITING GRANULES ONTO A MOVING SUBSTRATE

(75) Inventor: Bert W. Elliott, Westerville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 135 days.

(21) Appl. No.: 10/055,864

(22) Filed: Jan. 22, 2002

(65) Prior Publication Data

US 2003/0138601 A1 Jul. 24, 2003

(51) Int. Cl.[7] ............................ B32B 31/00; E00D 1/28

(52) U.S. Cl. ....................... 156/260; 156/264; 156/279; 156/512; 118/56; 118/38; 118/39; 118/57; 118/314; 427/186; 427/187; 427/289; 427/398.1; 52/554; 52/557; 83/929

(58) Field of Search ................................. 156/260, 264, 156/279, 512; 118/39, 38, 56, 57, 602, 603, 610, 313, 314, 315; 427/186, 187, 289, 398.1; 52/554, 557; 83/920

(56) References Cited

U.S. PATENT DOCUMENTS

| | | | | |
|---|---|---|---|---|
| 5,426,902 A | | 6/1995 | Stahl et al. | 52/314 |
| 5,611,186 A | | 3/1997 | Weaver | 52/557 |
| 5,666,776 A | | 9/1997 | Weaver et al. | 52/557 |
| 5,853,858 A | | 12/1998 | Bondoc | 428/195 |
| 5,901,517 A | | 5/1999 | Stahl et al. | 52/314 |
| 6,014,847 A | | 1/2000 | Phillips | 52/311.1 |
| 6,038,827 A | | 3/2000 | Sieling | 52/557 |
| 6,105,329 A | | 8/2000 | Bondoc et al. | 52/557 |
| 6,174,403 B1 | | 1/2001 | Steiner, Jr. et al. | 156/260 |
| 6,190,754 B1 | | 2/2001 | Bondoc et al. | 428/143 |
| 6,195,951 B1 | | 3/2001 | Stahl et al. | 52/314 |
| 6,212,843 B1 | | 4/2001 | Kalkanoglu et al. | 52/555 |
| 6,235,142 B1 | * | 5/2001 | Koschitzky | 156/260 |
| 2001/0000372 A1 | | 4/2001 | Kalkanoglu | 52/314 |
| 2002/0033225 A1 | * | 3/2002 | Becker et al. | 156/260 |

FOREIGN PATENT DOCUMENTS

| | | |
|---|---|---|
| WO | WO 96/17145 | 6/1996 |
| WO | WO 99/34073 | 7/1999 |

* cited by examiner

*Primary Examiner*—Linda L. Gray
(74) *Attorney, Agent, or Firm*—Inger H. Eckert; James J. Dottavio

(57) ABSTRACT

A method of making shingles includes providing a moving asphalt coated sheet having at least an overlay lane and an underlay lane. Blend drops of at least two color blends are discharged onto each lane, wherein at least one of the blend drops discharged onto the overlay lane has a different color blend from the color blends of all the blend drops discharged onto the underlay lane. Background granules are then discharged onto the asphalt coated sheet to form a granule coated sheet, and the excess granules are removed from the granule coated sheet.

6 Claims, 5 Drawing Sheets

SHINGLES WITH MULTIPLE BLEND DROPS AND METHOD OF DEPOSITING GRANULES ONTO A MOVING SUBSTRATE

TECHNICAL FIELD

This invention relates to shingles having multiple blend drops of granules and to methods and apparatus for depositing multiple blend drops onto a moving substrate.

BACKGROUND OF THE INVENTION

A common method for the manufacture of asphalt shingles is the production of a continuous strip of asphalt shingle material followed by a shingle cutting operation which cuts the material into individual shingles. In the production of asphalt strip material, a substrate such as an organic felt or a glass fiber mat is passed through a coater containing liquid asphalt to form a tacky asphalt coated strip. Subsequently, the hot asphalt strip is passed beneath one or more granule applicators which apply the protective surface granules to portions of the asphalt strip material. Typically, the granules are dispensed from a hopper at a rate which can be controlled by making adjustments to the flow of granules discharged from the hopper. In the manufacture of colored shingles, two types of granules are employed. Headlap granules are granules of relatively low cost for portions of the shingle which are to be covered up when the shingles are installed on a roof. Colored granules or prime granules are of relatively higher cost and are applied to the portion of the shingle which will be exposed on the roof.

Not all of the granules applied to the hot, tacky, asphalt coated strip adhere to the strip, and, typically, the strip material is turned around a slate drum to invert the strip and cause the non-adhered granules to drop off. These non-adhered granules, which are known as backfall granules, are usually recovered by collecting them in a backfall hopper. The backfall granules are eventually recycled and discharged onto the sheet.

To provide a color pattern of pleasing appearance the colored shingles are provided in different shades or color variations of the predominant color, usually in the form of a predominant background color and a series of granule deposits of different colors or different shades from the background color. These highlighted series of deposits, referred to as blend drops, are typically made by discharging granules from a series of blend drop granule dispensers that are positioned upstream from the background granule dispenser.

It would be advantageous if there could be developed a shingle, and a method and apparatus for making such a shingle, where the deposits of blend drop granules could be used to provide an even more aesthetically pleasing appearance when the shingle is applied with similar shingles on a roof.

SUMMARY OF THE INVENTION

The above objects as well as other objects not specifically enumerated are achieved by a method of making shingles, where the method includes providing a moving asphalt coated sheet having at least an overlay lane and an underlay lane. Blend drops of at least two color blends are discharged onto each lane, wherein at least one of the blend drops discharged onto the overlay lane has a different color blend from the color blends of all the blend drops discharged onto the underlay lane. Background granules are then discharged onto the asphalt coated sheet to form a granule coated sheet, and the excess granules are removed from the granule coated sheet.

According to this invention there is also provided a method of making shingles, where the method includes providing a moving asphalt coated sheet having an overlay lane, a middle lane and an underlay lane. Blend drops of at least two color blends are discharged onto each lane, wherein each lane has a combination of color blends for the blend drops different from the combination of color blends for the blend drops of the other two lanes. Background granules are discharged onto the asphalt coated sheet to form a granule coated sheet, and excess granules are removed from the granule coated sheet. The granule coated sheet is divided into continuous overlay, middle and underlay strips, and the continuous overlay, middle and underlay strips are laminated together to form trilaminate shingles.

According to this invention there is also provided a plurality of laminated shingles, each shingle comprising an overlay sheet and an underlay sheet. The overlay sheets have a prime area that is substantially covered with granules, including one or more blend drops from a first group of blend drops of at least two color blends. The underlay sheets are substantially covered with granules, including one or more blend drops from a second group of blend drops of at least two color blends. At least one of the color blends of a blend drop of the first group of blend drops is a different color from the color blends of all of the blend drops of the second group.

According to this invention there is also provided a plurality of trilaminated shingles, each shingle comprising an overlay sheet, a middle sheet and an underlay sheet. The overlay sheets have a prime area that is substantially covered with granules, including one or more blend drops from a first group of blend drops of at least two color blends. The underlay sheets are substantially covered with granules, including one or more blend drops from a second group of blend drops of at least two color blends. The middle sheets are substantially covered with granules, including one or more blend drops from a third group of blend drops of at least two color blends. The collection of the color blends for the blend drops of each of the first, second and third groups of blend drops is different from the collection of color blends for the blend drops of the other groups of blend drops.

Various objects and advantages of this invention will become apparent to those skilled in the art from the following detailed description of the preferred embodiments, when read in light of the accompanying drawings.

DETAILED DESCRIPTION OF THE INVENTION

Figure 1:
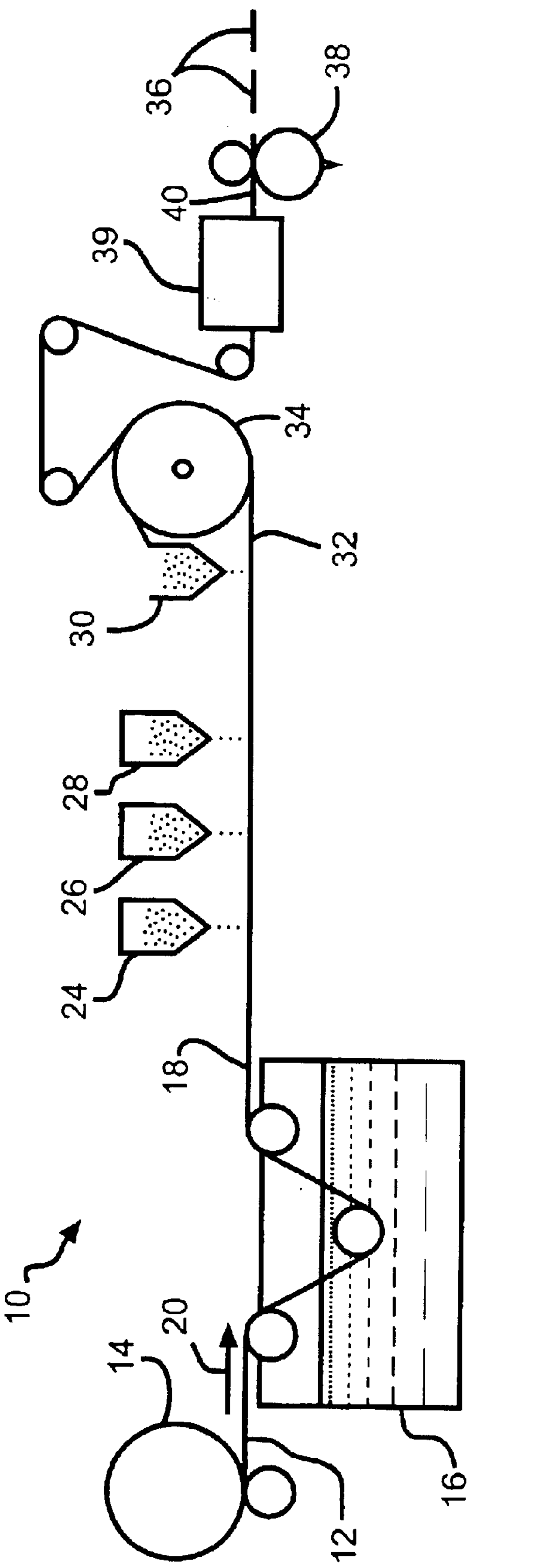
FIG. 1 is a schematic elevational view of a shingle manufacturing operation according to the invention.

As shown in FIG. 1, the apparatus for carrying out the method of the invention is indicated generally at 10. A shingle base mat 12, preferably a fiberglass mat, is payed out from a roll 14, and passed through an asphalt coater 16 to form an asphalt coated sheet 18. The asphalt coated sheet 14 moves in the machine direction, indicated by arrow 20. The sheet usually moves at a speed of at least about 200 feet/minute (61 meters/minute), and typically at a speed within the range of between about 450 feet/minute (137 meters/minute) and about 800 feet/minute (244 meters/minute). Blend drop granule dispensers 22, 24 and 26 are positioned above the asphalt coated sheet. These blend drop dispensers 22, 24 and 26 are designed to discharge blend drops of granules onto the asphalt coated sheet 18. Different ones of the plurality of blend drop dispensers 22, 24 and 26 can be arranged to apply blend drops of different shapes and color blends. The use of multiple blend drop dispensers is well known in the art.

Subsequent to the application of the blend drops by all the blend drop dispensers 22, 24 and 26, background and backfall granules are deposited by the backfall hopper 30 onto the asphalt coated sheet. The background granules adhere to the portions of the asphalt coated sheet that not are already covered by the blend drop granules. The background and backfall granules are applied to the extent that the asphalt coated sheet becomes completely covered with granules, and the sheet becomes a granule coated sheet 32. The granule coated sheet 32 is then inverted by traveling around the slate drum 34, which causes any excess granules to drop off on the backside of the drum and consequently be removed from the granule coated sheet. The excess granules are intercepted by a backfall hopper 30, which is positioned on the backside of the slate drum.

After passing around the slate drum, the granule covered sheet 32 is cooled, and subsequently cut into individual shingles 36 by a chopper 38, and packaged in bundles, not shown, for transportation to customers. The shingles of the invention are laminated shingles (having an upper sheet or overlay, and a lower sheet or underlay) or trilaminate shingles (having an overlay, an underlay and a middle sheet positioned between the overlay and the underlay). After the granule coated sheet 32 is cooled, prior to cutting the material into individual shingles, the granule coated sheet is cut longitudinally into continuous overlay and underlay strips, not shown, for laminated shingles, or into continuous overlay, middle and underlay strips, not shown, for the trilaminate shingles. These continuous strips are continuously fed together in a manner well known in the art, and then laminated together with a laminating adhesive to form continuous laminated strips 40. The cutting, aligning and laminating steps are shown schematically at 39 in FIG. 1. These steps are all known in the art, as evidenced, for example, by U.S. Pat. No. 5,102,487 to Lamb. Subsequently the continuous laminated strips 40 are cut to form the individual shingles 36.

Figure 2:
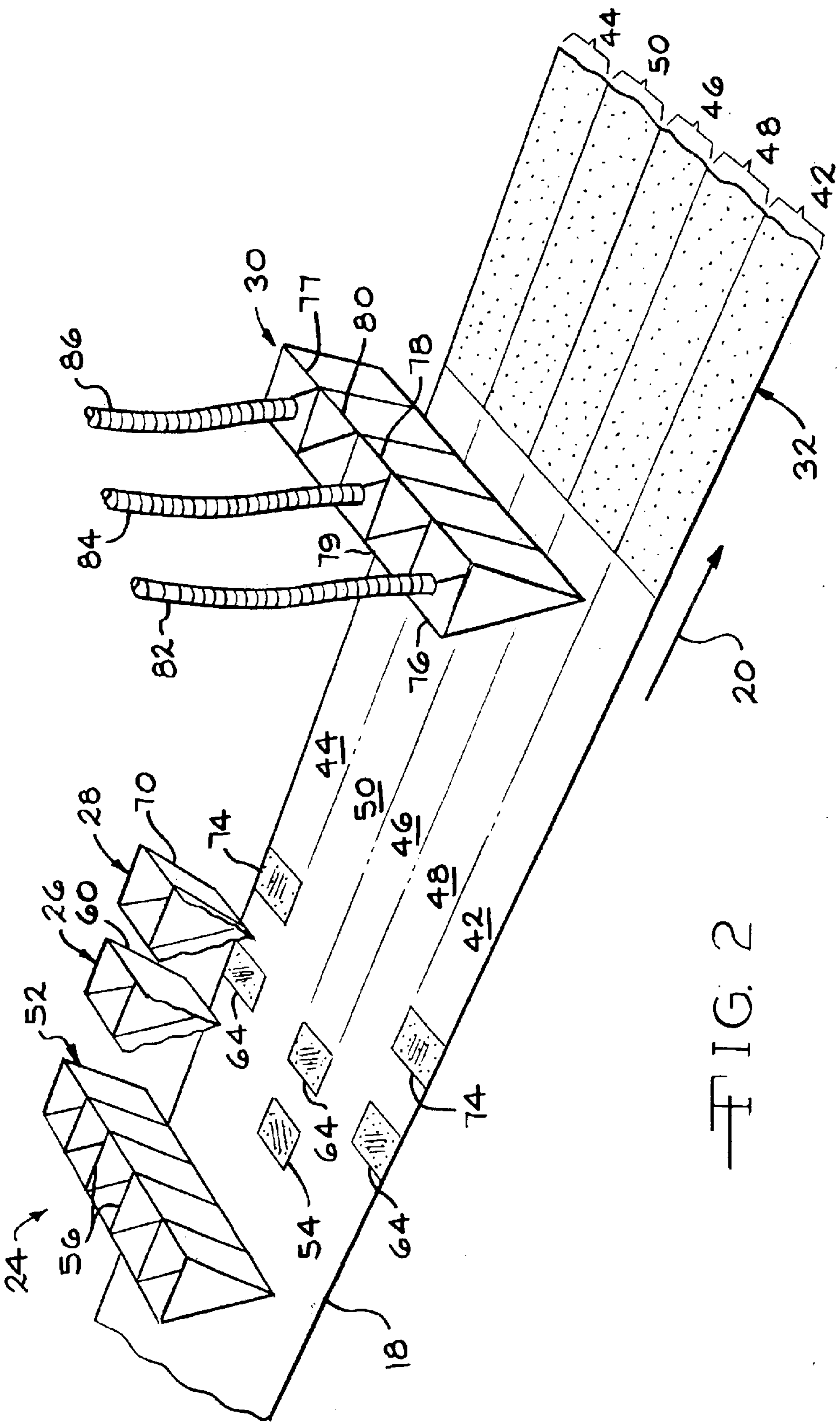
FIG. 2 is a schematic perspective view of the application of blend drops and background granules to the asphalt coated sheet according to the method of the invention.

As shown in FIG. 2, the asphalt coated sheet is being processed in a manner such that two laminated shingles are simultaneously made. The asphalt coated sheet can be viewed as being divided into various lanes during manufacturing, for purposes of illustration, although until the sheet is slit into the various lane components, it remains a single sheet. The outside or underlay lanes 42 and 44 are the underlay lanes for each of the two laminated shingles, respectively. These lanes 42 and 44 receive prime or colored granules, and also have blend drops applied to them. The innermost lane or overlay lane 46 is the overlay lane for the laminated shingle, and this also receives prime or colored granules, and it also has blend drops applied to it. The intermediate lanes 48 and 50 are headlap lanes, and these headlap lanes have headlap granules applied to them. In subsequent cutting steps, the underlay lanes 42, 44 are separated from the headlap lanes 48 and 50, respectively. Also, the overlay lane is cut into two complementary portions, such as with a tab and cutout design.

As further shown in FIG. 2, the blend drop dispenser 24 includes a hopper 52 for holding a quantity of granules for discharge onto the asphalt coated sheet 18. The blend drop dispenser 24 includes a mechanism, not shown, for metering and delivering granules from the hopper 52 onto the asphalt coated sheet 18 to form a blend drop 54. Several different types of blend drop dispensers are known in the art, and any of these would be suitable for purposes of the present invention. Granules are fed to the hopper 52 from granule supplies, not shown.

The blend drop dispenser 24 extends transversely across the moving asphalt coated sheet 18. It is to be understood that some shingle machines will be set up to make multiple shingles simultaneously, and blend drops are not needed in the headlap areas of the shingles. Therefore, although the hopper extends all the way across the shingle machine, i.e., across the asphalt coated sheet 18, the hopper 52 is provided with dividers 56 to segment the hopper into multiple compartments for accumulating granules of different colors or color blends, which correspond to various blend drops that are to be deposited on the asphalt coated sheet.

Blend drop dispensers 26 and 28 are also positioned transversely with respect to the moving asphalt coated sheet, but are shown partially cut away for purposes of clarity. The hopper 60 for granule dispenser 26 includes dividers, not shown, that segment the hopper 60 so that it can discharge three blend drops 64 onto the underlay lane 42, overlay lane 46 and underlay lane 44, respectively. The hopper 70 for granule dispenser 28 includes dividers, not shown, that segment the hopper 70 so that it can discharge two blend drops 74, onto underlay lanes 42 and 44, respectively.

As is well known in the art, blend drops applied to the asphalt coated sheet are often made up of granules of several different colors. For example, one particular blend drop that is supposed to simulate a weathered wood appearance might actually consist of some brown granules, some dark gray granules and some light gray granules. When these granules are mixed together and applied to the sheet as a blend drop in a generally uniformly mixed manner, the overall appearance of weathered wood is achieved. For this reason, the blend drops are referred to as having a color blend, which gives an overall color appearance, and this overall appearance may be different from any of the actual colors of the granules in the color blend. Also, blend drops of darker and lighter shades of the same color, such as, for example, dark gray and light gray, are referred to as different color blends rather than merely different shades of one color.

Figure 4:
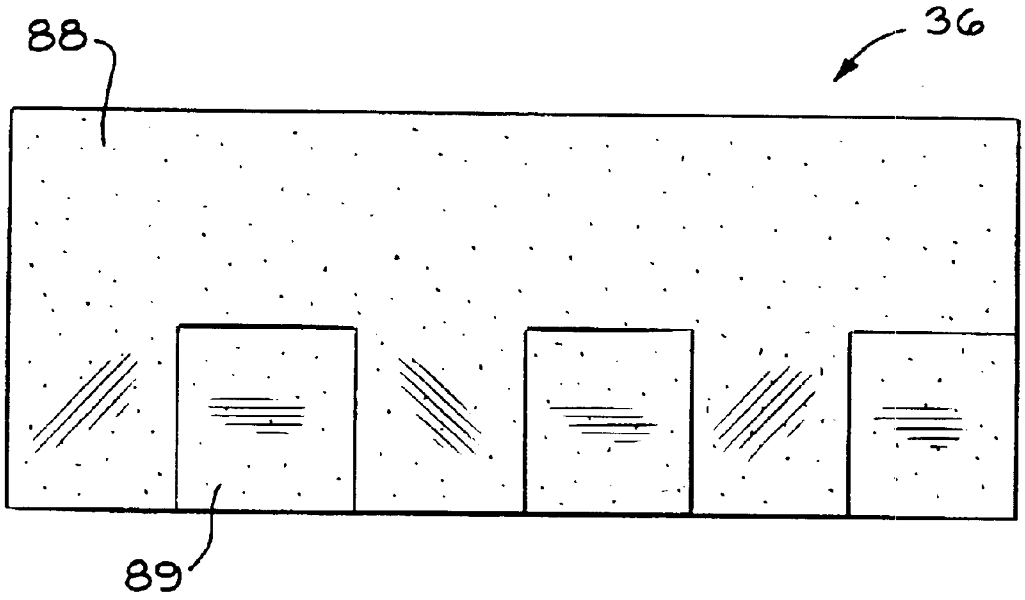
FIG. 4 is a plan view of a laminated shingle according to the invention.

The backfall hopper 30 sequentially follows the blend drop dispensers 22, 24 and 26, and it is divided by dividers into compartments 76–80. The compartments 76–80 correspond to the two underlay lanes, 42, 44, the overlay lane 46, and the two headlap lanes 48 and 50, respectively. Excess granules falling from the granule coated sheet 32 charge the compartments 76–80 with granules, and these granules are deposited continuously onto the asphalt coated sheet 18 to completely cover the sheet with granules. Additional background granules are fed to compartments 76, 77 and 78 by granule conduits 82, 84, and 86 from granule sources, not shown, so that those compartments contain not only granules recovered from their respective lanes (underlay lanes 42 and 44, and overlay lane 46), but also a substantial amount of fresh background granules. Likewise, headlap compartments 79 and 80 are connected to a source, not shown, of headlap granules to provide additional headlap granules. Once the granule coated sheet 32 is formed, the granule coated sheet can be divided into overlay and underlay strips, not shown, with the overlay strips including the associated headlap portion, and subsequently laminated together in a process, not shown, that is well known in the art. A laminated shingle 36 according to the present invention is shown in FIG. 4, and it includes an overlay sheet 88 and an underlay sheet 89.

The process of the embodiment of the invention shown in FIG. 2 involves discharging blend drops of at least two color blends on each lane that is to receive colored or prime granules. Underlay lanes 42 and 44 periodically receive blend drops 64 and 74 from blend drop dispensers 24 and 26, respectively. In contrast, overlay lane 46 periodically receives blend drops 54 and 64 from blend drop dispensers 24 and 26, respectively. It can be seen that at least one of the blend drops discharged onto the overlay lane 46 has a different color blend (i.e., blend drop 54) from the color blends of all the blend drops (i.e., blend drops 64 and 74) discharged on the underlay lanes 42 and 44. Although the underlay lanes 42 and 44 receive blend drops 64 and 74 of two color blends, three or more different color blends could be applied to the underlay lanes. Likewise, although the overlay lane 46 receives blend drops 54 and 64 from blend drop dispensers 24 and 26, respectively, three or more different color blends could be applied to the overlay lane 46. The important distinction between the application of the at least two blend drops to the underlay lanes and the at least two blend drops to the overlay lanes is that at least one of the blend drops discharged onto the overlay lane has a different color blend from the color blends of all the blend drops discharged onto the underlay lanes. This gives the laminated shingles of the invention a unique character by enabling different color combinations to be used on the underlay than those color combinations used on the overlay. Blend drops applied according to the present invention also provide a random appearance, as the coloration is not consistently applied at regular intervals.

Figure 3:
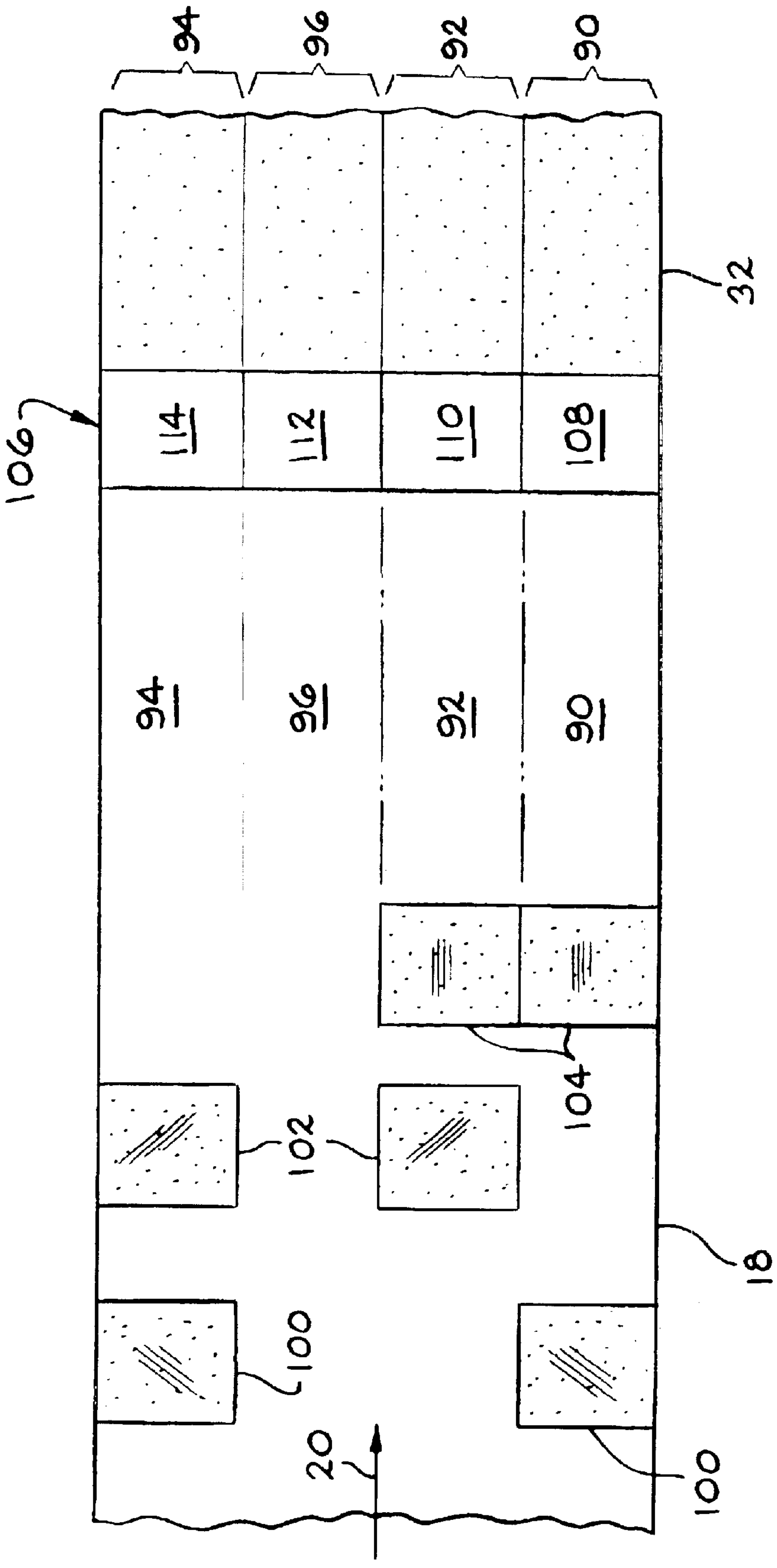
FIG. 3 is a schematic plan view of the application of blend drops and background granules to the asphalt coated sheet to make a trilaminate shingle according to the method of the invention.

As shown in FIG. 3, the asphalt coated sheet 18 can be viewed as having three lanes 90, 92 and 94 for the application of prime or colored granules, and a headlap lane 96 that receives headlap granules. The slate drum 34 and the blend drop applicators 22, 24 and 26 are not shown so that the other features of the invention can be illustrated more clearly. Underlay lane 90 receives blend drops 100 and 102 from blend drop dispensers 24 and 28, respectively. Overlay lane 92 receives blend drops 104 and 102 from blend drop dispensers 26 and 28, respectively. Middle lane 94 receives blend drops 100 and 102 from blend drop dispensers 24 and 26, respectively. The headlap lane 96 receives no blend drops. The backfall hopper 106 is segmented by dividers into compartments 108, 110, 112, and 114. Each of compartments 108, 110 and 114 receives recovered granules from the slate drum and original background granules from a source of granules, not shown. The headlap compartment 112 receives original headlap granules.

Figure 5:
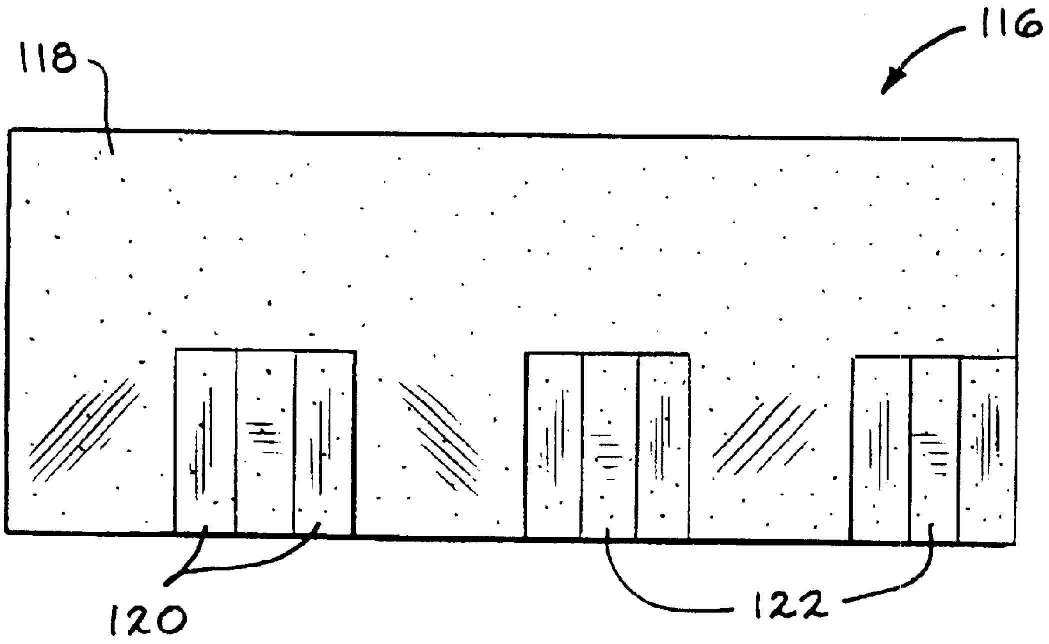
FIG. 5 is a plan view of a trilaminate shingle according to the invention.

The backfall hopper 106 dispenses granules continuously onto the asphalt coated sheet 18, resulting in the granule coated sheet 32. The granule coated sheet 32 can be subsequently divided to separate the middle lane 94 from the headlap lane 96, and to separate the underlay lane 90 from the overlay lane 92, thereby forming continuous underlay, overlay (including the headlap lane) and middle strips, not shown. According to the well known lamination process above, the underlay, overlay (including the headlap lane) and middle strips are laminated together to form a continuous trilaminate strip, not shown, and subsequently cut into trilaminate shingles 116, as shown in FIG. 5. The trilaminate shingle includes overlay sheet 118, middle sheet 120 and underlay sheet 122.

It can be seen that blend drops of at least two color blends are discharged onto each lane, wherein each lane has a combination of color blends for the blend drops different from the combination of color blends for the blend drops of the other two lanes.

Figure 6:
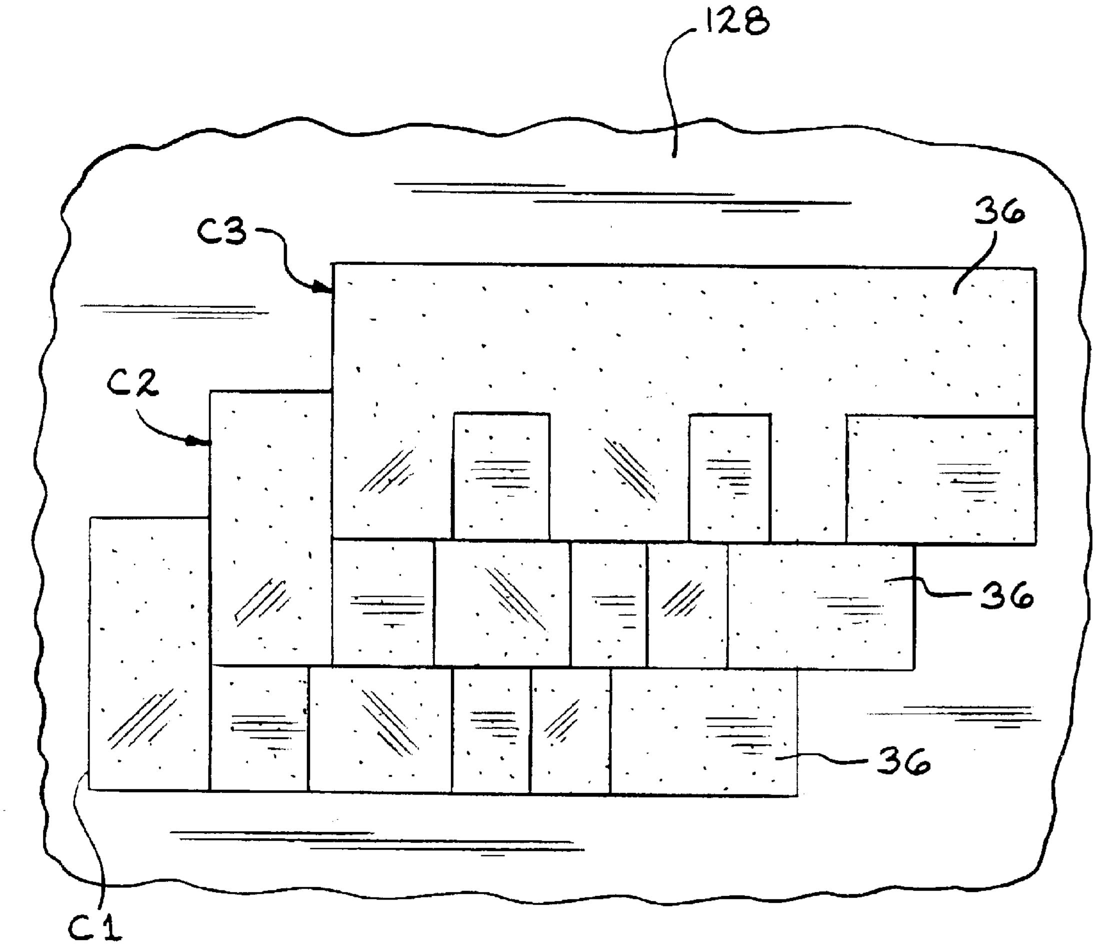
FIG. 6 is a roof having a roof covering of laminated shingles according to the invention.

As shown in FIG. 6, a plurality of laminated shingles 36 according to the invention can be installed on a roof 126. The installation can be in courses, C1, C2, and C3. In the alternative, the roof could be covered with trilaminate shingles similar to shingle 116.

This invention has been described as making two laminated shingles simultaneously, i.e., 2-wide, as shown in FIG. 1, or as making a single trilaminate shingle, i.e. 1-wide, as shown in FIG. 3. It is to be understood that the invention can be applied to shingle manufacturing machines that make any number of shingles simultaneously.

In another embodiment, the invention includes shadow lines on the tabs and/or cutouts; i.e. the shingle includes granules of a lighter or darker shade at either the top and/or bottom of one or more tabs and/or cutouts. A few examples of shadows are provided in commonly assigned U.S. Pat. No. 6,014,847 to Phillips, which is incorporated herein by reference. Additionally, as shown in FIG. 5, the middle layer 120 may form a shadow line adjacent one or more of the tabs of the overlay within the cutout of the overlay, as the middle layer 120 may include granules of a different color than the overlay 118 and underlay 122, thereby forming a light or dark shadow adjacent the tab to add depth to the shingle.

The principle and mode of operation of this invention have been described in its preferred embodiments. However, it should be noted that this invention can be practiced otherwise than as specifically illustrated and described without departing from its scope.

What is claimed is:

1. A method of making shingles comprising:

providing a moving asphalt coated sheet having at least an overlay lane and an underlay lane;

discharging blend drops of at least two color blends onto each lane, wherein at least one of the blend drops discharged onto the overlay lane has a different color blend from the color blends of all the blend drops discharged onto the underlay lane;

discharging background granules onto the asphalt coated sheet to form a granule coated sheet; and removing excess granules from the granule coated sheet.

2. The method of claim 1 including:

discharging blend drops of three color blends onto the overlay lane and discharging blend drops of three color blends onto the underlay lane;

wherein at least one of the blend drops discharged onto the overlay lane has a different color blend from the color blends of all the blend drops discharged onto the underlay lane.

3. The method of claim 1 including:

dividing the granule coated sheet into overlay and underlay strips; and laminating the overlay and underlay strips together to form shingles.

4. The method of claim 3, wherein one of the blend drops forms a shadow line on a tab or cutout of the shingle.

5. A method of making shingles comprising:

providing a moving asphalt coated sheet having an overlay lane, a middle lane and an underlay lane;

discharging blend drops of at least two color blends onto each lane, wherein each lane has a combination of color blends for the blend drops different from the combination of color blends for the blend drops of the other two lanes;

discharging background granules onto the asphalt coated sheet to form a granule coated sheet;

removing excess granules from the granule coated sheet;

dividing the granule coated sheet into continuous overlay, middle and underlay strips; and laminating the continuous overlay, middle and underlay strips together to form trilaminate shingles.

6. The method of claim 5 in which:

the step of removing excess granules includes collecting excess granules in a backfall hopper that segregates excess granules from lane to lane; and the step of applying background granules includes applying to each lane excess granules removed from that lane.

* * * * *